United States Patent Office 3,542,801
Patented Nov. 24, 1970

3,542,801
2-AMINOTHIAZOLES
Robert E. Manning, Mountain Lakes, N.J., assignor to Sandoz, Inc., Hanover, N.J.
No Drawing. Filed Jan. 22, 1968, Ser. No. 699,333
Int. Cl. C07d *91/34*
U.S. Cl. 260—306.8
3 Claims

ABSTRACT OF THE DISCLOSURE

This disclosure pertains to substituted phenyl thiazoles, e.g., 2-amino-4-(2-aminoethylamino)-5-(p-chlorophenyl)thiazole dihydrocholride. The compounds are useful as hypotensive agents.

---

This invention relates to novel heterocyclic compounds. More particularly, this invention pertains to certain 2-amino-5-(p-halophenyl)thiazole, to acid addition salts thereof and to methods for preparing these compounds. The 2-aminothiazoles of the present invention may be represented by the following structural formula

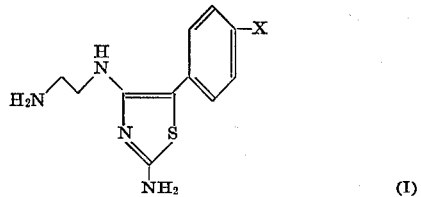

where X is halo having an atomic weight of about 19-80.

The above compounds (I) may be prepared by treating a corresponding 2-(α-chlorobenzyl)-2-imidazoline (II) or an acid addition salt thereof, such as the hydrochloride, with thiourea in a solvent such as an ether, e.g., tetrahydrofuran and diethyl ether, a chlorinated hydrocarbon such as methylene chloride and chloroform, or an alcohol such as a loweralkanol, e.g., methanol, ethanol, and isopropanol. The reaction may be conducted at temperatures of from about 25° C. to about 100° C., preferably about 50° C. to about 80° C. Neither the temperature nor the solvent is critical in obtaining the products (I). The products may be recovered using conventional techniques.

The α-chlorobenzyl imidazolines mentioned above (II) are prepared by treating the corresponding α-hydroxybenzyl imidazole with thionyl chloride, preferably in solvent such as a loweralkanol or chlorinated hydrocarbon, e.g., methylene chloride, at a temperature of from about 25° C. to about 60° C., preferably about 35° C. to about 45° C. The solvent and temperature of reaction are not critical in obtaining the desired α-chlorobenzyl imidazoline and excess thionyl chloride may be used as solvent, if desired. The product α-chlorobenzylimidazolines (II) may be recovered using conventional techniques. Certain of the α-hydroxybenzyl imidazoline starting products are known compounds and may be prepared according to methods disclosed in the literature. Those α-hydroxybenzyl imidazolines starting products not known are prepared from known materials using analogous methods.

When the products of Formula I are recovered as acid addition salts the free base is obtained by utilizing conventional techniques such as dissolving the product in solvent, e.g., ethanol, and treating the resulting solution with a base, for example, sodium carbonate. When it is desired to prepare an acid addition salt from the free base, such salt may be obtained by salification.

The compounds of Formula I above are useful because they possess pharmacological properties in animals. In particular, these compounds may be used as hypotensive agents as indicated by their activity in anesthetized dog provided a dosage of 20–30 mg./kg. of active ingredient, i.v., and tested by blood pressure measurement using a mercury manometer or transducer via a catheter inserted in the carotid or femoral artery. When so utilized, these compounds may be combined with one or more pharmaceutically acceptable carriers or adjuvants. They may be administered orally or parenterally and, depending upon the mode of administration, the exact dosage utilized may vary.

Furthermore, these compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these compounds are administered at a daily dosage of about 1 milligram to about 25 milligrams per kilogram of animal body weight. This daily dosage is preferably administered 2 to 4 times a day, or in sustained release form. For most large mammals, the total daily dosage is from about 100 milligrams to about 500 milligrams. Dosage forms suitable for internal use comprise from about 25 milligrams to about 250 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
|---|---|
| 2 - amino - 4 - (2-aminoethylamino)-5-(p-chlorophenyl)thiazole dihydrochloride | 30 |
| Tragacanth | 2 |
| Lactose | 59.5 |
| Corn starch | 5 |
| Talcum | 3 |
| Magnesium stearate | 0.5 |

The following example is provided for the purpose of illustration and not by way of limitation. It is not intended so as to limit the scope of the invention as defined in the appended claims.

EXAMPLE

2 - amino - 4 - (2 - aminoethylamino) - 5 - (p - chlorophenyl)thiazole dihydrochloride

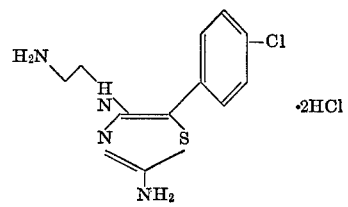

A mixture of 2-(p-chloro-α-hydroxybenzyl)-2-imidazoline hydrochloride (28 g.) in methylene chloride (560 ml.) and thionyl chloride (13.5 g.) is heated under reflux for one hour. The reaction mixture is evaporated in vacuo and the residue is crystallized from ethanol (25 ml.) and ether (100 ml.) to give 21.8 g. of 2-(α-p-dichlorobenzyl) - 2 - imidazoline hydrochloride; M.P. 199–203° C. with decomposition.

A mixture of 2-(α-p-dichlorobenzyl)-2-imidazoline hydrochloride (13.0 g.) and thiourea (4.0 g.) in ethanol is refluxed 2 hours. The reaction mixture is evaporated in vacuo and the residue is crystallized from ethanol-ether (1:3) to afford 11.5 g. of 2-amino-4-(2-aminoethylamino)-5-(p-chlorophenyl)thiazole dihydrochloride; M.P. 248–250° C.

What is claimed is:

1. A compound of the formula

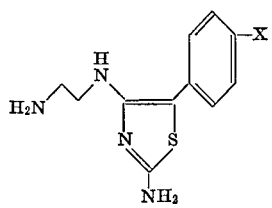

where X represents halo having an atomic weight of 19–80 or the pharmaceutically acceptable acid addition salts thereof.

2. The compound according to claim 1 which is 2-amino - 4 - (2 - aminoethylamino)-5-(p-chlorophenyl)-thiazole.

3. A process for preparing a compound of claim 1 which comprises treating in solvent 2-(α-chloro-p-$X_1$ benzyl)-2-imidazoline or an acid addition salt thereof with thiourea, where X represents halo having an atomic weight of 19–80.

References Cited

UNITED STATES PATENTS

| | | | |
|---|---|---|---|
| 2,709,172 | 5/1955 | Dodson | 260—306.8 |
| 3,210,368 | 10/1965 | Huebner | 260—306.8 |
| 3,250,779 | 5/1966 | Halpern et al. | 260—306.8 |

ALTON D. ROLLINS, Primary Examiner

U.S. Cl. X.R.
260—309.6; 424—270